US009665936B2

(12) United States Patent
Kluckner et al.

(10) Patent No.: US 9,665,936 B2
(45) Date of Patent: May 30, 2017

(54) SYSTEMS AND METHODS FOR SEE-THROUGH VIEWS OF PATIENTS

(71) Applicant: Siemens Healthcare GmbH, Erlangen (DE)

(72) Inventors: Stefan Kluckner, Lawrenceville, NJ (US); Vivek Kumar Singh, Monmouth Junction, NJ (US); Kai Ma, Plainsboro, NJ (US); Yao-Jen Chang, Princeton, NJ (US); Terrence Chen, Princeton, NJ (US); Daphne Yu, Yardley, PA (US); John Paulus, Jr., East Windsor, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 139 days.

(21) Appl. No.: 14/865,925

(22) Filed: Sep. 25, 2015

(65) Prior Publication Data

US 2017/0091939 A1   Mar. 30, 2017

(51) Int. Cl.
*G06K 9/00* (2006.01)
*G06T 7/00* (2017.01)
*G06T 11/00* (2006.01)

(52) U.S. Cl.
CPC ......... *G06T 7/0016* (2013.01); *G06T 11/005* (2013.01); *G06T 2207/10081* (2013.01); *G06T 2207/10088* (2013.01)

(58) Field of Classification Search
None
See application file for complete search history.

(56) References Cited

U.S. PATENT DOCUMENTS

| | | | | |
|---|---|---|---|---|
| 8,909,958 B2* | 12/2014 | Schindler | ............... | H04L 12/10 713/300 |
| 9,119,670 B2* | 9/2015 | Yang | ..................... | A61B 5/055 |
| 2005/0018891 A1* | 1/2005 | Barfuss | .................... | A61B 6/12 382/131 |
| 2008/0269588 A1* | 10/2008 | Csavoy | ................. | A61B 34/20 600/407 |
| 2011/0153993 A1* | 6/2011 | Gopal | ................ | G06F 9/30094 712/221 |
| 2013/0245461 A1* | 9/2013 | Maier-Hein | ......... | A61B 5/0035 600/476 |
| 2015/0139532 A1* | 5/2015 | Kim | ....................... | G06T 7/579 382/154 |
| 2015/0350618 A1* | 12/2015 | Meier | .................. | H04N 9/3185 345/7 |
| 2016/0157938 A1* | 6/2016 | Breisacher | .......... | G06F 19/3437 703/11 |

* cited by examiner

*Primary Examiner* — Nancy Bitar

(57) ABSTRACT

A computer-implemented method for providing a see-through visualization of a patient includes receiving an image dataset representative of anatomical features of the patient acquired using a medical image scanner and acquiring a body surface model of the patient using an RGB-D sensor. The body surface model is aligned with the image dataset in a canonical/common coordinate system to yield an aligned body surface model. A relative pose of a mobile device is determined with respect to the RGB-D sensor and a pose dependent visualization of the patient is created by rendering the image dataset at a viewpoint corresponding to the relative pose of the mobile device. Then, the pose dependent visualization of the patient may be presented on the mobile device.

20 Claims, 4 Drawing Sheets

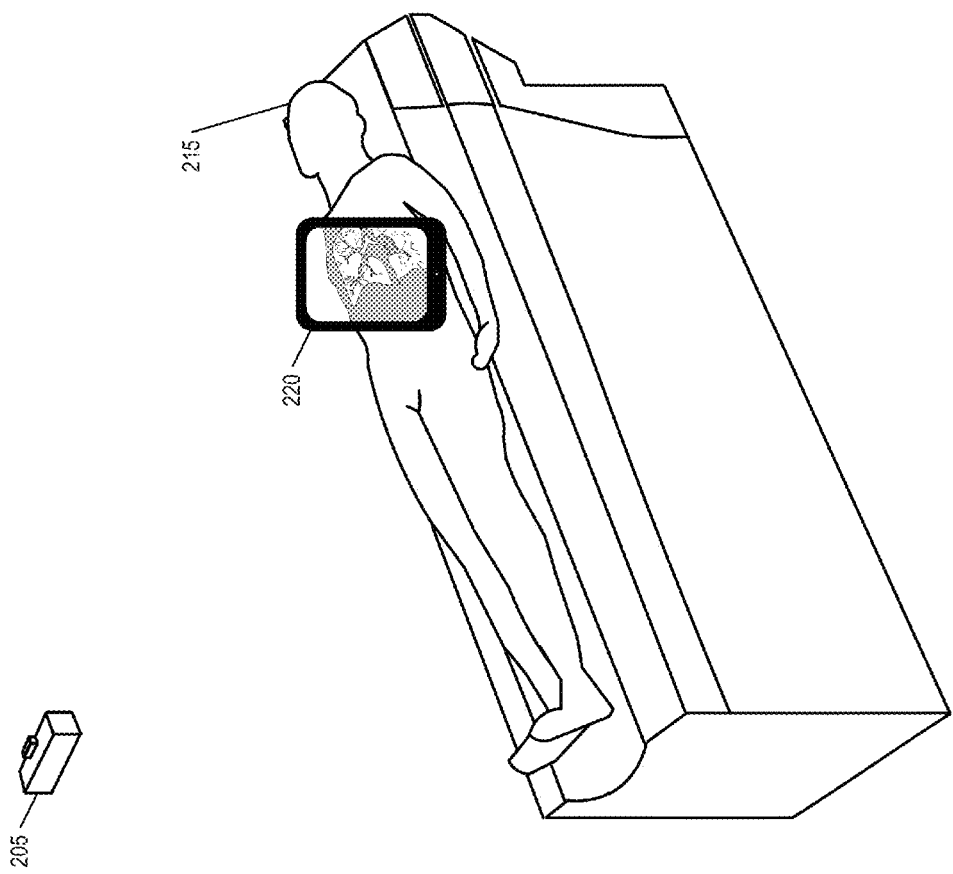

SYSTEMS AND METHODS FOR SEE-THROUGH VIEWS OF PATIENTS

TECHNOLOGY FIELD

The present invention relates generally to methods, systems, and apparatuses for providing see-through views of patients. The technology disclosed here may be used to perform a visualization/rendering of personal modalities such as Computed Tomography (CT), Magnetic Resonance Imaging (MRI), Positron Emission Tomography (PET), and Ultrasound using a mobile device and RGB-D data stream.

BACKGROUND

Medical image modalities such as Computed Tomography (CT), Magnetic Resonance Imaging (MRI), Positron Emission Tomography (PET), and Ultrasound are capable of providing 3D views of a patient's anatomy. However, the data acquired by such modalities only provides a static view of the patient. Although the acquired data can be displayed and/or manipulated in a variety of ways (e.g., through rotation), this manipulation is generally limited and clinicians cannot always achieve all the views that they would desire to make a thorough examination of the patient. Moreover, once acquired, the data is divorced from the real-world and the clinician is required to mentally map the displayed image to locations of a patient's physical anatomy.

The positioning capabilities of mobile devices have evolved quickly over the past several years. Upcoming mobile devices include sensor technology which provides accurate location measurements in six degrees of freedoms (location and camera view). This information will support many applications since it enables navigation and interaction in 3D space easily.

Accordingly, it is desired to create a technique for performing visualization and rendering of a 3D medical image modality using a mobile device.

SUMMARY

Embodiments of the present invention address and overcome one or more of the above shortcomings and drawbacks, by providing methods, systems, and apparatuses related to technologies enabling an interactive inside view of the patient using various scanner modalities. An RGB-D camera acquires the observed person's body surface in 3D space. A detector recognizes salient corresponding landmarks between an RGB-D cue and scanner modality. The detected landmarks support the automated registration with scanner modalities. A device equipped with positioning capabilities is used to interactively track the live patient surface. The pose is used to update a display, either on the positioning device, or separately, with the rendering of the scanner modalities to be fused with the live view to achieve a see-through effect. The see-through techniques enable the joint continuous visualization of body hull and internal body structures at various levels of detail.

According to some embodiments, a computer-implemented method for providing a see-through visualization of a patient includes receiving an image dataset representative of anatomical features of the patient acquired using a medical image scanner and acquiring a body surface model of the patient using an RGB-D sensor. The body surface model is aligned with the image dataset in a canonical/common coordinate system to yield an aligned body surface model. A relative pose of a mobile device is determined with respect to the RGB-D sensor and a pose dependent visualization of the patient is created by rendering the image dataset at a viewpoint corresponding to the relative pose of the mobile device. Then, the pose dependent visualization of the patient may be presented on the mobile device.

Various features of the aforementioned method may be refined, supplemented, or otherwise modified in different embodiments. For example, in some embodiments, the RGB-D sensor is internal to the mobile device. In some embodiments, a new relative pose of the mobile device is determined and a new pose dependent visualization of the patient is created by rendering the image dataset at a new viewpoint corresponding to the new relative pose of the mobile device. This new pose dependent visualization of the patient may then be presented on the mobile device. In some embodiments, a user selection of a new image modality is received. In response, a second image dataset aligned with the body surface model in the canonical/common coordinate system is retrieved. A new relative pose of the mobile device is determined and a new pose dependent visualization of the patient is created by rendering the second image dataset at a new viewpoint corresponding to the new relative pose of the mobile device. Then, the new pose dependent visualization of the patient may be presented on the mobile device.

The technique used for aligning the body surface model with the image dataset may vary in different embodiments of the present invention where the aforementioned method is applied. For example, in some embodiments, the alignment is performed by determining first landmarks in the image dataset and determining second landmarks in the body surface model, wherein each of second landmarks corresponds to one of the first landmarks. The correspondences between the first landmarks and the second landmarks may then be used to align the body surface model with the image dataset. In some embodiments, the first landmarks are annotated on bone surfaces included in the image dataset and the first landmarks are projected to a skin surface of the patient prior to aligning the body surface model with the image dataset. The alignment may be performed using, for example, an affine, rigid, or non-rigid transformation. In some embodiments, the correspondences between the first landmarks and the second landmarks are used to deform the image dataset to the body surface model prior to presenting the pose dependent visualization on the mobile device.

In some embodiments of the aforementioned method, an origin point location for the mobile device is determined and the relative pose is determined based on a position change between the origin point location and a current pose of the mobile device when presenting the pose dependent visualization on the mobile device. In some embodiments, a calibration image displayed at a pre-determined physical location is acquired and used to determine the origin point location for the mobile device. In some embodiments, the origin point location for the mobile device is based on storage of the mobile device in a holder at a pre-determined location.

According to other embodiments of the present intention, an article of manufacture for providing a see-through visualization of a patient comprises a non-transitory, tangible computer-readable medium holding computer-executable instructions for performing the aforementioned method, with or without the additional features discussed above.

According to another aspect of the present invention, a system for providing a see-through visualization of a patient includes an RGB-D sensor configured to acquire a body surface model of the patient, a computer readable medium storing an image dataset representative of anatomical features of the patient acquired using a medical image scanner, and a mobile device comprising at least one processor. The mobile device's processor is configured to align the body surface model with the image dataset in a canonical/common coordinate system to yield an aligned body surface model and determine a relative pose of the mobile device with respect to the RGB-D sensor. The processor is further configured to create a pose dependent visualization of the patient by rendering the image dataset at a viewpoint corresponding to the relative pose of the mobile device, and present the pose dependent visualization of the patient. In some embodiments, the mobile device comprises an internal orientation sensor unit configured to provide orientation information used to determine the relative pose. In some embodiments, the RGB-D sensor is internal to the mobile device.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 2B provides an illustration of the third stage of processing where the internal structure of the patient is visualized on a mobile device, according to some embodiments.

DETAILED DESCRIPTION OF ILLUSTRATIVE EMBODIMENTS

The following disclosure describes the present invention according to several embodiments directed at methods, systems, and apparatuses related to a medical visualization technology that provides see-through views of a patient. More specifically, the techniques described herein provide an interactive inside view of the patient's body using various scanner modalities. An RGB-D sensor acquires the observed person's body surface in 3D space. A detector recognizes salient corresponding landmarks between the RGB-D cue and scanner modality. The detected landmarks support the automated registration with scanner modalities. A mobile device is used to interactively render views/partial views of the body according to the current pose of the device (relative pose between body surface and the mobile device). In some embodiments, magic lens techniques enable the joint continuous visualization of body hull and internal body structures at various levels of detail. The technology disclosed herein may be used to perform visualization/rendering of personal modalities such as Computed Tomography (CT), Magnetic Resonance Imaging (MRI), Positron Emission Tomography (PET), and Ultrasound using a mobile device and RGB-D data stream.

Personal visualization of acquired scanner modalities in relation to body surfaces is feasible due to efficient real-time processing and improved techniques for fusion of different modalities. The proposed techniques focus on the mobile visualization of acquired scanner modalities in combination with collected body surfaces. The mobile device enables an interactive visualization/rendering of the body structures at various levels of details depending on the current position of the mobile device with respect to the world coordinate system of the acquired scanner modalities.

Figure 1:
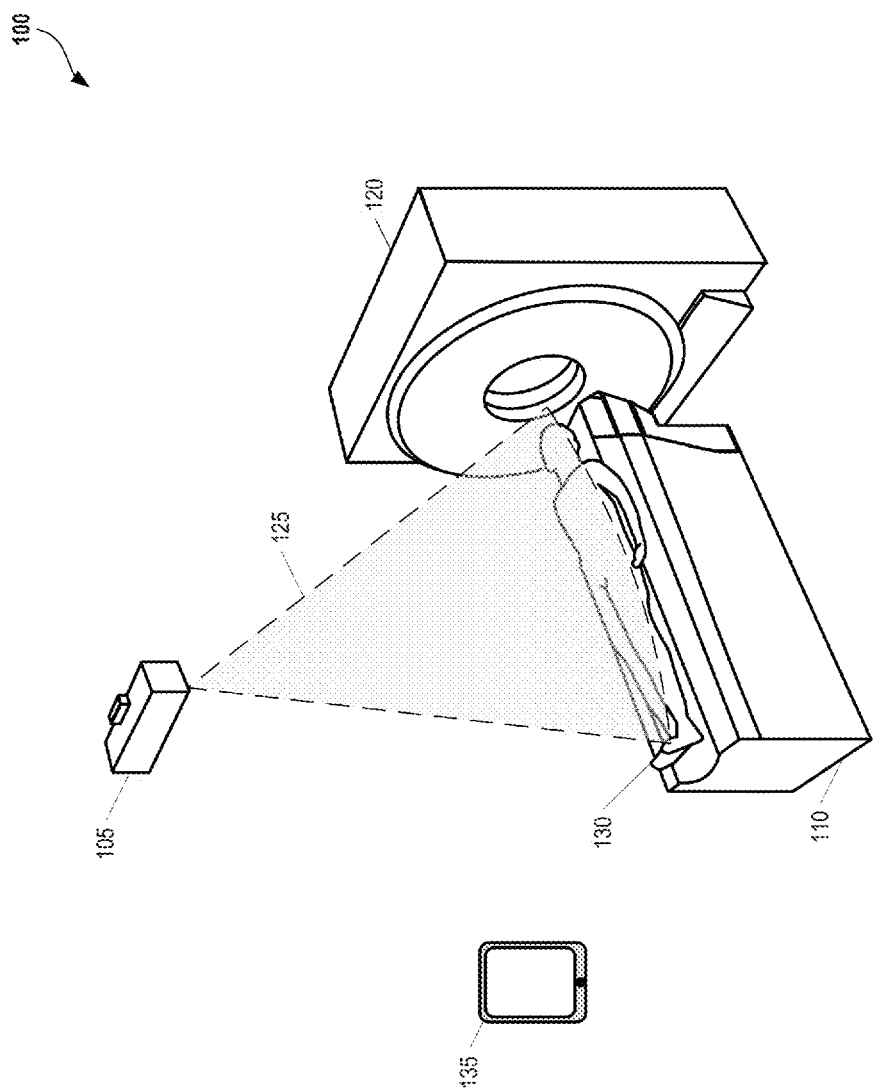
FIG. 1 provides an overview of a visualization system that may be applied in a clinical setting, according to some embodiments.

FIG. 1 provides an overview of the visualization system 100 that may be applied in a clinical setting, according to some embodiments. The visualization system includes an RGB-D sensor 105 which is configured to capture data comprising RGB color information with depth information. Various types of RGB-D sensors generally known in the art may be utilized in implementing the visualization techniques described herein including, for example, Microsoft Kinect and Google Tango or conventional stereo- or multi-camera rigs providing depth information. In the example of FIG. 1, the RGB-D sensor 105 projects an infrared pattern 125 on a patient table 110 where a patient 130 is positioned. The reflection of the infrared pattern 125 is captured by an infrared camera in the RGB-D sensor 105. The captured data is then compared to reference patterns stored in the RGB-D sensor 105 to estimate pixel depth. This depth data is correlated to an RGB camera in the RGB-D sensor 105 to yield an RGB image with depth information (i.e., "RGB-D" data). The end result of this capture and processing is an RGB-D stream with a body surface model representative of the patient 130.

In the example of FIG. 1, the RGB-D sensor 105 is mounted to the ceiling of a room in which an imaging device is installed. In the example of FIG. 1, this imaging device is a CT Imaging Device comprising a patient table 110 and the gantry 120. CT is an imaging technology that uses computer-processed X-ray beams to produce tomographic images of specific areas of a scanned patient. The patient lies on the patient table 110 and is moved during the examination along a system axis, also referred to as the z-axis, into the measurement field generated in the gantry 120. Inside the gantry 120, the patient is showered with X-ray beams. Each X-ray beam comprises bundles of energy (or "photons") which, depending on the structure of the imaged material, may pass through, be absorbed by, or be redirected (i.e., scattered) by the structure. The degree to which an X-ray beam is reduced by an object during imaging is referred to as attenuation. Based on this attenuation, a 3D image of the patient's internal anatomy is generated.

A mobile device 135 equipped with positioning capabilities in 6 degrees-of-freedom (DoF) interactively render views/partial views of the body according to the current pose of the device (relative pose between body surface and mobile device). The data displayed on the mobile device includes the images gathered via the imaging scan and any other images acquired of the patient 130. Thus, various imaging modalities can be combined to provide different views of the patient 130. For example, in some embodiments, magic lens techniques enable the joint continuous visualization of body hull and internal body structures at various levels of detail. Various types of mobiles devices may be used in the context of the visualization system 100 including, for example, smartphones, tablets, and other handheld computing devices. The configuration and operation of these devices is generally known in the art and, thus, only briefly described herein.

It should be noted that the visualization system 100 illustrated in FIG. 1 may be modified according to different embodiments of the present invention. For example, medical personal image data from the imaging device may be gathered in advance and stored (along with data from other image modalities) on the mobile device 135 or on a remote storage medium accessible to the mobile device 135. Thus, visualization may be applied at site that is not necessary co-located with image acquisition. Additionally, although the RGB-D sensor 105 is described as being separated from the mobile device 135, in other embodiments the RGB-D sensor 105 and the mobile device 135 may be combined. For example, the RGB-D sensor 105 may be internal to the mobile device 135 (e.g., as provided by Google Tango) or it may be connected to the mobile device 135 (e.g., via a communication port on the mobile device 135).

Figure 2A:
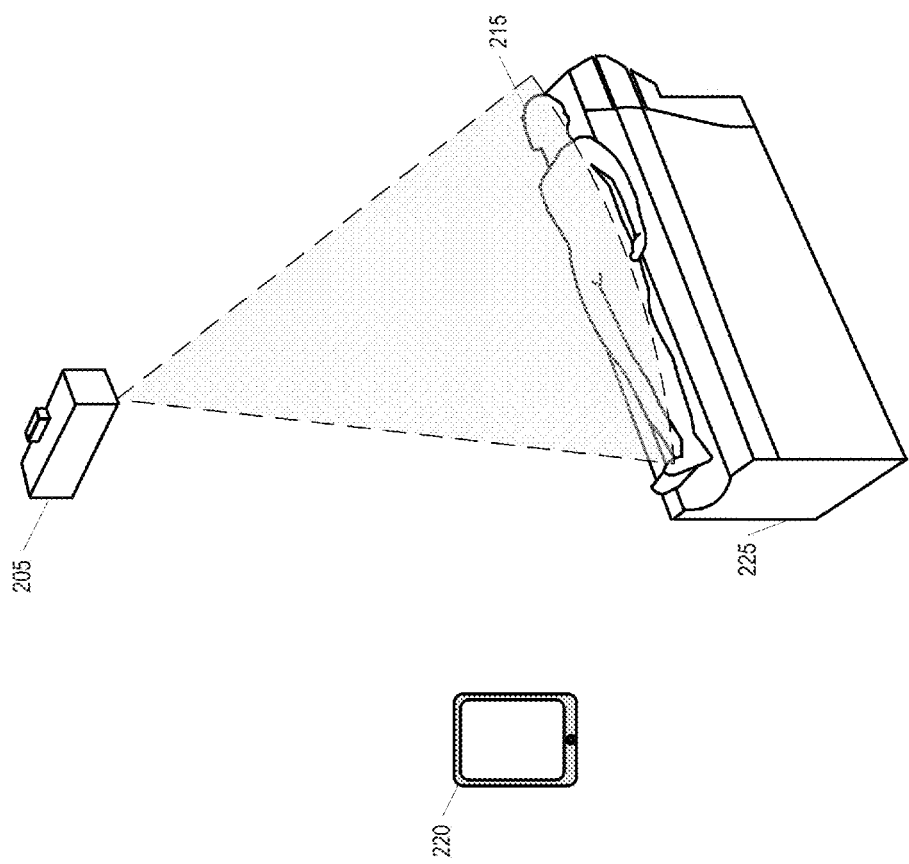
FIG. 2A provides an illustration of the calibration and registration stages of the visualization process, as implemented in some embodiments.

FIGS. 2A and 2B illustrate how data may be processed to provide see-through views of a patient, according to some embodiments. Conceptually, these figures separate the processing into three stages: calibration, registration, and running mode/visualization of scanner modality. Each of these stages is discussed in detail below.

FIG. 2A provides an illustration of the calibration and registration stages of visualization process, as implemented in some embodiments. As an initial matter, note that FIG. 2A does not include a medical image scanner (in contrast to FIG. 1). It is assumed that all medical images have been acquired beforehand and stored either on the mobile device 220 or on a remote storage medium accessible to the mobile device 220.

During the first stage of processing, the coordinate system associated with the mobile device 220 is registered with the world coordinate system of the patient 215 derived from data acquired using the image scanner Since the mobile device 220 provides metric relative pose information, the mobile device 220 may be set to a predefined origin, for example, by pointing the camera center to a unique pattern mounted on the patient table 225 or by using a holder (not shown in FIG. 2A) installed at a predetermined location. During this calibration step, a stream of RGB-D data may be collected from the RGB-D sensor 205 for subsequent alignment with the data from the image scanner. The acquired RGB-D stream represents the surface of the observed body of the patient 215. Using an external RGB-D, the extrinsic calibration parameters have to be estimated in advance. For example, this may be determined based on the relative pose between the RGB-D sensor 205 center and mobile device 220 camera center pose when the device is in the holder or pointing at the pattern on the patient table 225. In embodiments where the mobile device 220 has an internal RGB-D sensor, the prior extrinsic calibration step can be omitted. Additional techniques for calibrating an RGB-D sensor to an image scanner, filed Sep. 25, 2015 and entitled "Calibrating RGB-D Sensors to Medical Image Scanners," the entirety of which is incorporated herein by reference.

During the second stage of processing, the captured body 3D surface model is aligned with the scanner modality of the image data. According to some embodiments, a cross-modality correspondence estimation technique is used based on learned landmarks recognized in the RGB-D stream and corresponding scanner modality. Once the subject scan is loaded to the system, the detected landmarks in the RGB-D stream may be associated to the corresponding landmarks on the scanner modality. The scanner modality landmarks may be initially annotated on the bone surface for better accuracy, and a projection from the bone surface to the skin surface is required to match the RGB-D observations. Then, the two image systems can be aligned, for example, through an affine transformation (or another rigid or non-rigid transformation) calculated between the relative correspondences between two landmark sets. To better compensate the registration errors from inaccurate landmark detection results, a parameterized deformable mesh (PDM) model may be applied to correct the landmark locations. Compared to landmark detectors trained with local features, PDM leverages the global shape information and generates an optimal avatar mesh that closely fits to the skin surface of the subject. Therefore, the landmark errors due to noisy input data (clothing, sensor noise and etc.) can be significantly reduced.

FIG. 2B provides an illustration of the third stage of processing where the internal structure of the patient is visualized on the mobile device 220, according to some embodiments. For providing the fused live view visualization, the computed general affine transformation between the detected landmark sets may be used to set up the virtual camera used to render the scan modality data to provide an aligned view with the correct orientation, scaling and projection. The relative pose between origin and the current pose of the position sensing mobile device is used to update the view point of the rendered scene. Because the scanner modality is aligned with the body surface model within the world coordinate system, the mobile device 220 can visualize the scanner modality as well as the surface model generated using the RGB-D sensor 205.

Rendering can either be performed locally on the mobile device 220 or, alternatively, rendering can be performed remotely with streaming technologies using a client-server architecture. A server approach may allow for higher quality rendering of 3D image volume from the modality in instances where the mobile device 220 cannot meet the computational requirements for efficiently processing data from the image scanner. In the server case, the mobile device 220 may decode a compressed image stream already rendered and encoded at the server. Compression is often needed in conservation of transmission bandwidth.

In some embodiments, the live RGB-D data from the RGB-D sensor 205 is used to construct a color point cloud or surface object(s). The live color information can be mapped to the point cloud/surface with varying opacity. The live constructed object(s) can be added to a rendering scene together with the scan modality data in an augmentation step. Such a rendering scene produced a 3D view with the effect of the live object hull enclosing the scan modality data. The modality data may be rendered as direct image/volume, or as extracted surface structures with or without texture values sampled from the modality image.

In some embodiments, the rendered view can be augmented onto the live image to produce the final see-through effect on the mobile device 220 as shown in FIG. 2B. Optionally, the corresponding landmarks of the live object hull can be used as anchor points to deform the texture coordinates of the scan modality image. The result is a warped scan modality data object that interpolates the modality data to the live shape. In a simpler approach, the construction of the hull can be skipped and overlay the scan modality onto the live image directly rendered according to the detected pose. The mobile device 220 may include a graphical user interface (GUI) which allows the user to interact with the displayed images, for example, by changing the type of images displayed (e.g., switching imaging modalities) or by zooming in or out of a particular region on the patient 215.

Figure 3:
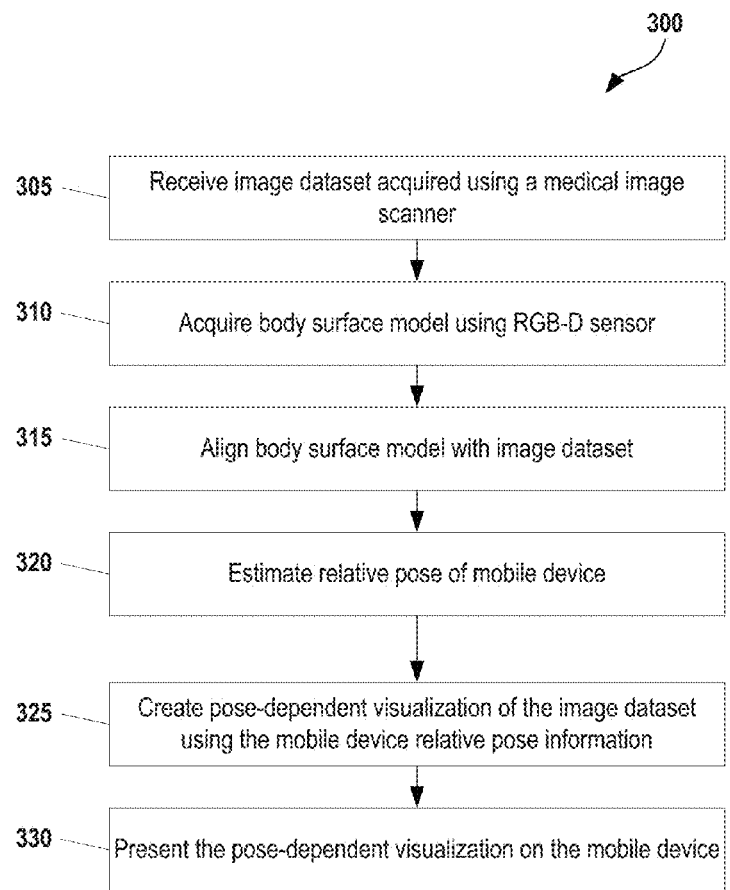
FIG. 3 provides an overview of a process for providing a see-through visualization of a patient using the system and techniques described above with respect to FIGS. 2A and 2B.

FIG. 3 provides an overview of a process 300 for providing a see-through visualization of a patient using the system and techniques described above with respect to FIGS. 2A and 2B. Starting at step 305, an image dataset representative of anatomical features of the patient is received. This image dataset comprises 3D image data acquired using one or more medical image scanners. In some embodiments, the dataset is acquired directly from the image scanner itself, while in other embodiments, the dataset is acquired via a server that stores previously acquired image data.

Continuing with reference to FIG. 3, at step 310, an RGB-D sensor is used to acquire a body surface model of the patient according to the techniques described above with respect to FIGS. 1, 2A, and 2B. At step 315, the body surface model is aligned with the image dataset in a canonical/common coordinate system to yield an aligned body surface model. In some embodiments, a set of landmarks are detected and used to align the RGB-D data with the image data set from the medical image scanner. The set of landmarks includes salient key points which are recognizable in the involved modalities (points, contours, geometric primitives, markers, unique patterns). The landmarks may include, for example, anatomical landmarks on the patient's body and/or external scene markers.

At step 320, the relative pose of a mobile device with respect to the RGB-D sensor is determined. This relative pose may be determined using a six degree of freedom (DoF) pose estimation determined by using inertial sensors in the mobile device. Next, at step 325, a pose dependent visualization of the patient is created by rendering the image dataset at a viewpoint corresponding to the relative pose of the mobile device. Then, at step 330, this pose dependent visualization of the patient is presented on the mobile device. Moving/navigating the mobile device enables a visualization of the image data from different viewpoints and levels of details. The mobile device also may provide the user with the ability to interact with the visualization, for example, using touch or other gestures. Additionally, in some embodiments, the mobile device provides the user with the ability to switch between the live view (for interactive visualization) or standard offline visualization of the medical scanner data (to interact using touch and/or other gestures). The device automatically recalibrates itself when switched to the live view.

The visualization techniques described herein may be utilized in a variety of scenarios. For example, a physician can point to critical structures and derive precise positioning during subsequent procedures (e.g., an additional imaging). The visualization system can be used during interventional procedures to interactively visualize and browse the preoperative scans. Online registration can be achieved in near-real time by tracking landmarks and updating the patient body pose. Additionally, the visualization system can be used for interactive visualization and discussion of scans with the patient.

The visualization techniques would be also useful for educational purposes as well as training technicians. For example, previously obtained medical scans can be browsed and visualized by registering to a phantom lying on the table and the tool essentially provides an intuitive way to interact with the medical data. The proposed concept may be highly relevant for medical forensics. The medical scans (from various modalities) of a cadaver or corpse can be efficiently and effectively browsed.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application may be used to implement one or more of the techniques described herein, for example, on the mobile device discussed above with reference to FIGS. 1-3. Such an application comprises code or machine readable instructions for configuring a processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A computer-implemented method for providing a see-through visualization of a patient, the method comprising: receiving an image dataset representative of anatomical features of the patient acquired using a medical image scanner; acquiring a body surface model of the patient using an RGB-D sensor; aligning the body surface model with the image dataset in a canonical/common coordinate system to yield an aligned body surface model by determining a plurality of first landmarks in the image dataset; determining a plurality of second landmarks in the body surface model, each of the plurality of second landmarks corresponding to a distinct one of the plurality of first landmarks; and using correspondences between the plurality of first landmarks and a plurality of second landmarks to align the body surface model with the image dataset; determining a relative pose of a mobile device with respect to the RGB-D sensor; creating a pose dependent visualization of the patient by rendering the image dataset at a viewpoint corresponding to the relative pose of the mobile device; and presenting the see-through pose dependent visualization of the patient on the mobile device.

2. The method of claim 1, wherein the RGB-D sensor is internal to the mobile device.

3. The method of claim 1, further comprising: annotating the plurality of first landmarks on bone surfaces included in the image dataset; and projecting the plurality of first landmarks to a skin surface of the patient prior to aligning the body surface model with the image dataset.

4. The method of claim 1, wherein an affine transformation is used to align the body surface model with the image dataset.

5. The method of claim 1, wherein a rigid transformation is used to align the body surface model with the image dataset.

6. The method of claim 1, wherein a non-rigid transformation is used to align the body surface model with the image dataset.

7. The method of claim 1, further comprising: using the correspondences between the plurality of first landmarks and the plurality of second landmarks to deform the image dataset to the body surface model prior to presenting the pose dependent visualization on the mobile device.

8. The method of claim 1, further comprising:
determining an origin point location for the mobile device,
wherein the relative pose is determined based on a position change between the origin point location and a current pose of the mobile device when presenting the pose dependent visualization on the mobile device.

9. The method of claim 8, further comprising:
acquiring a calibration image displayed at a pre-determined physical location; and
determining the origin point location for the mobile device based on acquisition of the calibration image.

10. The method of claim 8, further comprising:
detecting storage of the mobile device in a holder at a pre-determined physical location; and
determining the origin point location for the mobile device based on storage of the mobile device in the holder.

11. The method of claim 1, further comprising:
determining a new relative pose of the mobile device;
creating a new pose dependent visualization of the patient by rendering the image dataset at a new viewpoint corresponding to the new relative pose of the mobile device;
presenting the new pose dependent visualization of the patient on the mobile device.

12. The method of claim 1, further comprising:
in response to receiving a user selection of a new image modality, retrieving a second image dataset aligned with the body surface model in the canonical/common coordinate system;
determining a new relative pose of the mobile device;
creating a new pose dependent visualization of the patient by rendering the second image dataset at a new viewpoint corresponding to the new relative pose of the mobile device;
presenting the new pose dependent visualization of the patient on the mobile device.

13. An article of manufacture for providing a see-through visualization of a patient, the article of manufacture comprising a non-transitory, tangible computer-readable medium holding computer-executable instructions for performing a method comprising: receiving an image dataset representative of anatomical features of the patient acquired using a medical image scanner; acquiring a body surface model of the patient using an RGB-D sensor; aligning the body surface model with the image dataset in a canonical/common coordinate system to yield an aligned body surface model by determining a plurality of first landmarks in the image dataset; determining a plurality of second landmarks in the body surface model, each of the plurality of second landmarks corresponding to a distinct one of the plurality of first landmarks; and using correspondences between the plurality of first landmarks and a plurality of second landmarks to align the body surface model with the image dataset; determining a relative pose of a mobile device with respect to the RGB-D sensor; creating a pose dependent visualization of the patient by rendering the image dataset at a viewpoint corresponding to the relative pose of the mobile device; and presenting the see-through pose dependent visualization of the patient on the mobile device.

14. The article of manufacture of claim 13, wherein the method further comprises: annotating the plurality of first landmarks on bone surfaces included in the image dataset; and projecting the plurality of first landmarks to a skin surface of the patient prior to aligning the body surface model with the image dataset.

15. The article of manufacture of claim 13; wherein an affine transformation is used to align the body surface model with the image dataset.

16. The article of manufacture of claim 13, wherein the method further comprises: using the correspondences between the plurality of first landmarks and the plurality of second landmarks to deform the image dataset to the body surface model prior to presenting the pose dependent visualization on the mobile device.

17. The article of manufacture of claim 13, wherein the method further comprises:
determining an origin point location for the mobile device,
wherein the relative pose is determined based on a position change between the origin point location and a current pose of the mobile device when presenting the pose dependent visualization on the mobile device.

18. A system for providing a see-through visualization of a patient, the system comprising: an RGB-D sensor configured to acquire a body surface model of the patient; a computer readable medium storing an image dataset representative of anatomical features of the patient acquired using a medical image scanner; a mobile device comprising at least one processor configured to: align the body surface model with the image dataset in a canonical/common coordinate system to yield an aligned body surface model by determining a plurality of first landmarks in the image dataset; determining a plurality of second landmarks in the body surface model, each of the plurality of second landmarks corresponding to a distinct one of the plurality of first landmarks; and using correspondences between the plurality of first landmarks and a plurality of second landmarks to align the body surface model with the image dataset; determine a relative pose of the mobile device with respect to the RGB-D sensor, create a pose dependent visualization of the patient by rendering the image dataset at a viewpoint corresponding to the relative pose of the mobile device, and present the see-through pose dependent visualization of the patient.

19. The system of claim 18, wherein the mobile device comprises an internal orientation sensor unit configured to provide orientation information used to determine the relative pose.

20. The system of claim 18, wherein the RGB-D sensor is internal to the mobile device.

* * * * *